United States Patent Office 3,845,217
Patented Oct. 29, 1974

3,845,217
BUFFERED SMOKING SUBSTITUTE
COMPOSITIONS
Ove Birger Ferno and Corfitz Bengt Ingvar Ohlsson, Helsingborg, Sweden, assignors to Aktiebolaget Leo, Helsingborg, Sweden
No Drawing. Filed Nov. 16, 1972, Ser. No. 307,397
Int. Cl. A23g 3/30; A24b 15/00
U.S. Cl. 426—3                                    17 Claims

ABSTRACT OF THE DISCLOSURE

Chewable smoking substitute compositions which are relatively non-irritating to the throat comprising about 15 to 80 weight percent gum base, nicotine, and at least one solid physiologically-acceptable water-soluble buffering agent, capable upon chewing of maintaining the pH of the saliva above the normal physiological pH of the saliva (ca. 7.4).

BACKGROUND OF THE INVENTION

(1) Field of the Invention

Nicotine-containing chewing gum compositions.

(2) Prior Art

Chewable forms of tobacco and tobacco substitutes are not of recent origin. Snuff and chewing tobacco substitutes have been particularly attractive to workers in the prior art. Such compositions are not, however, particularly scientific in nature, and generally comprise a mixture of natural substances, such as tobacco extracts or the like, which present their own problems, and such compositions have in many ways been just as objectionable as the habit they were designed to attempt to replace. Smoking substitute compositions have also been proposed, but have not differed substantially from the snuff or chewing tobacco substitute compositions, and have moreover met with little success up to the present. U.S. Pats. 865,026 and 940,-521 are representative. Recently, however, chewable compositions comprising nicotine *per se* bound to a cation exchanger and embodied in a gum base have been proposed, and these have provided definite advantages over previous compositions having as their purpose to provide a substitute for tobacco and/or smoking. Further, compositions comprising nicotine *per se* or in an adsorbed state embodied in a high percentage of gum base to facilitate slow release upon chewing have also been proposed recently, with most of the same advantages. In these latest compositions, the nicotine can be present in free base or salt form, or complexed or adsorbed, and numerous striking results and advantages appear to result from employment thereof. In particular, they appear to assist smokers to cut down or give up smoking because they are relatively clean, no worse than an ordinary chewing gum habit, and since they provide slow release of nicotine over an extended period and generally mimic smoking sufficiently so as to provide a sense of smoking satisfaction upon chewing.

We have, however, now found in clinical trials involving such compositions that smokers, who have attempted to give up smoking by substituting nicotine-containing chewing gum for cigarette, cigar, or pipe smoking, experience an irritating sensation in the throat upon chewing such compositions. Although some smokers can accept this sensation, many smokers cannot learn to accept it and therefore return to smoking. This newly-discovered problem obviously requires solution. We have solved it by the employment of a suitable buffering substance. Although buffering agents have been used in different compositions for different purposes, for example to prevent stomach upset or to neutralize acid produced in the gastro-intestinal tract, so far as we are aware buffering substances have never been suggested for nicotine-containing gum compositions, much less to eliminate an irritation or burning sensation in the throat produced by such compositions in the absence of a buffering agent. In fact, the present development runs counter to previous suggestions that the buccal pH should be maintained at less than about 7, preferably in the range of about 4 to 5, by incorporating a physiologically-acceptable acidifying agent into a chewable nicotine-containing composition.

SUMMARY OF THE INVENTION

It has accordingly now been found that even smokers who cannot or will not learn to accept the aforesaid irritating sensation in the throat caused by previously-available nicotine-containing compositions, can still successfully and willingly employ our new nicotine-containing chewing gums to curb or eliminate their desire for smoking. Such new compositions contain a suitable buffering substance or agent so that, upon chewing, they produce an increase in the pH of the saliva above that normally attained upon chewing (which approaches a maximum of pH 7.4). This pH is hereinafter sometimes referred to as the normal physiological pH of the saliva.

By employing such a pH-adjusting nicotine composition, the irritant sensation in the throat upon chewing is practically eliminated so that smokers, who have previously not been able to use nicotine-containing chewing gums as a substitute for smoking, can now use such chewing gums containing buffering agents or substances. This unpredictable result of eliminating the irritant sensation can be obtained by incorporating in the chewing gum composition a solid physiologically-acceptable buffering agent for the buccal or oral cavity, which is effective therein and which accordingly must have a certain minimum of water solubility, such as sodium carbonate, potassium carbonate, trisodium phosphate, calcium hydroxide, or the like, or mixtures thereof. Calcium carbonate, for example, is excluded a buffer as it does not have a sufficient water-solubility to act as a buffer in the buccal or oral cavity. Alkali metal carbonates or phosphates are preferred buffering agents. In order to increase the buffering capacity still further without correspondingly increasing the pH, it has been found especially suitable according to certain embodiments of the invention to provide a bicarbonate, e.g., sodium or potassium bicarbonate, as a second or auxiliary buffering agent. Alkali metal bicarbonates are preferred for this purpose. Thus, preferred buffering agents comprise a mixture of an alkali metal carbonate or phosphate and an alkali metal bicarbonate. The amount of such buffering agent or agents in the chewing gum composition is preferably sufficient to raise the pH of the saliva to above 7.5 and optimally to maintain the pH of the saliva well above 7.5 (e.g., pH 8–10), preferably for at least 5 to 10 minutes of chewing. We have found that a suitable amount of buffering agent is between 0.5 and five percent, preferably one to three percent, by weight of the total composition.

After chewing a gum according to the present invention, for example, containing three percent sodium carbonate, for a period of five minutes, the pH of the saliva rises to about 9 and, even after twelve minutes of chewing, the pH of the saliva is still about 8. After chewing another gum according to the present invention containing one percent each of sodium carbonate, potassium carbonate and sodium bicarbonate, the pH of the saliva remains at ca. 8 during a chewing period of 12 minutes. No significant irritation of the throat, mouth, or mucous membranes is encountered or reported during these periods of mastication.

The amount of nicotine in each chewing gum should be that amount sufficient to provide a sense of smoking satisfaction. This of course varies from person to person. We have found that a sufficient amount generally lies between one and ten milligrams per chewing gum unit, preferably between one and five milligrams per chewing gum unit (calculated as nicotine base). The nicotine in the chewing gum of the present invention is preferably incorporated as the free base or a water-soluble physiologically-acceptable salt, either *per se* or adsorbed on a regenerative adsorbent, or preferably as a complex with an insoluble cation exchanger, or mixtures of the foregoing, but any other suitable physiologically-acceptable form may also be employed, provided only that the nicotine is or is made available in water-soluble form at some time during the chewing process, since absorption of nicotine from the buccal or oral cavity appears necessary for operativeness of the compositions of the invention by way of providing a sense of smoking satisfaction. Numerous water-soluble physiologically-acceptable nicotine salts are known, and any may be used, for example the tartrate, the citrate, the hydrochloride, the hydrobromide, and innumerable others. It is obvious that, for best results, the solid water-soluble physiologically-acceptable buffering agent or agents should be dispersed throughout the nicotine chewing gum composition, preferably as uniformly as possible.

The amount of gum base in the compositions of the invention is between about 15 and 80 percent by weight of total composition, preferably at least about 40 percent. The amount of gum base employed for the most desirable slow release of nicotine is usually in the higher ranges when nicotine *per se* or in salt or adsorbed form is used, but may be and frequently is in the lower ranges when a nicotine-cation exchanger complex is employed.

DETAILED DESCRIPTION OF THE INVENTION

When nicotine and the buffering agent or agents are incorporated into the chewing gum mass in accordance with the present invention, it is possible to employ a wide variety of chewing gum compositions as long as a relatively high gum base concentration, at least about forty percent by weight, is present when nicotine is present as the free base, in the form of a salt, or adsorbed. When nicotine occurs bound to a cation exchanger, there is no such limitation as far as the chewing gum base concentration is concerned. A manufacturer of chewing gums can thus incorporate a solid complex of nicotine bound to a cation exchanger into his own composition without having to change the same and it is thus also possible rather conveniently to satisfy different taste preferences.

The release rate of nicotine from the composition can be varied by varying the amount of nicotine which is bound to a given quantity of cation exchanger or incorporated into a given quantity of gum, either as the free base or in the form of a salt or adsorbed. A relatively higher amount of nicotine present in the composition gives a quicker release and vice versa.

By the term "slow release" as used herein is meant that the major portion of the nicotine is released upon chewing from the smoking substitute composition substantially uniformly over a period of several minutes and preferably over a period of at least 10 minutes. Most preferably the release time is at least fifteen minutes.

A complex containing nicotine bound to the cation exchanger is preferably prepared in a special unit. The solid complex thus prepared is easy to handle and minimizes personnel risks involved in the manufacture of the final chewing gum product. It has also been shown that the complex acts as a lubricant, thereby facilitating mixture of the different solid ingredients before incorporation into the gum mass. A homogeneous product is readily obtained in this manner.

The ion exchanger must have cation exchanging groups in order to form a nicotine-ion exchanger complex. Preferably, before formation of the complex, these groups are in the hydrogen ionic form.

The exchanger in addition can contain anionic groups, in which event it is known as a polyampholyte.

The cation exchanging groups which are present may be strongly acidic, weakly acidic, or of intermediate acidity, synthetic cation exchangers containing these groups accordingly being called strongly acidic, weakly acidic, or intermediate acidic cation exchangers, depending on the strength of the acid from which these functional groups are derived.

Examples of suitable acidic groups which may be present are carboxylic, sulphonic acid, phosphonous acid, phosphonic acid, phosphoric acid, iminodiacetic acid, or phenolic groups. When the groups are phenolic groups, their arrangement or content preferably is such that the acidic strength is comparatively high. Ion exchangers containing such phenolic groups are disclosed by Adams, B. A. and Holmes, E. L., in J. Soc. Chem. Ind. *54*, IT (1935). It is possible to obtain any desired pattern of release simply by using a suitable mixture of counter ions in the same ion-exchanger or a suitable mixture of different ion-exchangers, the real compound ion-exchangers (polyampholytes) included. It is also possible to vary the pattern of release by altering the amount of nicotine which is bound to a given amount of ion exchanger.

It is of course necessary that the cation exchanger, which is generally synthetic, is non-toxic in the amounts used and that it should not give an undesirable taste to the compositions. However, these requirements do not present any serious problem, since the amount of ion exchanger required for binding a sufficient amount of nicotine in suitable compositions according to the invention is small.

The acidic groups of the ion exchanger, which may be termed an ion exchange resin, may be bound to a cross-linked polymer such as addition polymers of styrene and divinylbenzene, divinylbenzene and methacrylic acid, divinylbenzene and acrylic acid, phenolic resins, or cellulose, dextran or pectin crosslinked with, e.g., epichlorhydrin.

The acidic groups can be bound to insoluble linear polymers, e.g., cellulose with nitrous gases, whereby mainly uronic acid groups are formed. Such compounds are disclosed by Ott, E. and Spurlin, H. M., Cellulose and Cellulose Derivatives, Part I, Interscience, New York (1954). Carboxymethyl cellulose, sulphoethyl cellulose, cellulose sulphate, etc., can also be used. In order to ensure that cellulose polymers containing the acidic groups are insoluble in the saliva, it is necessary that the number of acidic groups be relatively low, e.g., a maximum of 1 per three glucose units. Such compounds are discolsed by Ott, E. and Spurlin, H. M., Cellulose and Cellulose Derivatives, Part II, Interscience, New York (1954). Representative cation exchangers suitable for use according to the invention are given in Table I.

TABLE I
[Representative cation exchangers in accord with the foregoing]

| Name | Type crosslinked polymer | Functional groups | Manufacturer |
|---|---|---|---|
| Amberlite IRC 50 | Divinylbenzene-methacrylic acid | Carboxylic | Rohm & Haas. |
| Amberlite IRP 64 | do | do | Do. |
| Amberlite IRP 64M | do | do | Do. |
| BIO-REX 70 | Divinylbenzene-acrylic acid | do | BIO-RAD Lab. |
| Amberlite IR 118 | Styrene-divinylbenzene | Sulfonic | Rohm & Haas. |
| Amberlite IRP 69 | do | do | Do. |
| Amberlite IRP 69M | do | do | Do. |
| BIO-REX 40 | Phenolic | do | BIO-RAD Lab. |
| Amberlite IR 120 | Styrene-divinylbenzene | do | Rohm & Haas. |
| Dowex 50 | do | do | Dow Chemical. |
| Dowex 50W | do | do | Do. |
| Duolite C 25 | do | do | Chemical Process Co. |
| Lewatit S 100 | do | do | Farbenfabriken Bayer. |
| Ionac C 240 | do | do | Ionac Chem. |
| Wofatit KPS 200 | do | do | I. G. Farben Wolfen. |
| Amberlyst 15 | do | do | Rohm & Haas. |
| Duolite C-3 | Phenolic | do | Chemical Process. |
| Duolite C-10 | do | do | Do. |
| Lewatit KS | do | do | Farbenfabriken Bayer. |
| Zerolit 215 | do | do | The Permutit Co. |
| Duolite ES-62 | Styrene-divinylbenzene | Phosphonous | Chemical Process. |
| BIO-REX 63 | do | Phosphonic | BIO-RAD Lab. |
| Duolite ES-63 | do | do | Chemical Process. |
| Duolite ES-65 | Phenolic | Phosphoric | Do. |
| Chelex 100 | Styrene-divinylbenzene | Iminodiacetic | BIO-RAD Lab. |
| Dow Chelating Resin A-1 | do | do | Dow Chemical Company. |
| CM Sephadex C-25 | Dextran | Carboxy methyl | Pharmacia Fine Chemicals. |
| SE Sephadex C-25 | do | Sulphoethyl | Do. |

In an alternative embodiment, a nicotine-regenerative adsorbent complex comprising either the nicotine *per se* or a water-soluble physiologically-acceptable nicotine salt bound to or sorbed on a regenerative adsorbent, such as finely divided silicic acid, amorphous silica, magnesium silicate, calcium silicate, a clay, a crystalline aluminosilicate, macaloid, bentonite, activated carbon, kaolin, alumina, hydroxylapatite, or the like, is incorporated into a chewable gum base composition having a relatively high gum base concentration. The nicotine can be bound to the adsorbent either by absorption, adsorption, or both, thus the term "sorbed" as used herein is taken to mean either or both of the binding mechanisms.

We set out below the properties and characteristics of four ion exchange resins that have been found to be of particular suitability in the invention and which are discussed frequently elsewhere in the specification.

| No. | Name | Manufacturer |
|---|---|---|
| 1 | Amberlite IRP 64 | Rohm & Haas, Philadelphia. |
| 2 | Amberlite IRP 64M | Do. |
| 3 | Amberlite IRP 69M | Do. |
| 4 | BIO-REX 63 | BIO-RAD Lab., Richmond, California. |

| No. | Type | Functional groups |
|---|---|---|
| 1 | Weakly acidic, methacrylic type | Carboxylic. ($R.COO_3^-H^+$) |
| 2 | do | Do. |
| 3 | Strongly acidic, polystyrene type | Sulphonic. ($R.SO_3^-H^+$) |
| 4 | Intermediate acidic, polystyrene type | Phosphonic. ($R.PO_3^-(H^+)_2$) |

| No. | Ionic form | Crosslinkage, percent divinylbenzene |
|---|---|---|
| 1 | Hydrogen | Not published, but according to the manufacturer this resin "While a gel resin" reacts as a "relatively high porosity" resin. |
| 2 | do | Do. |
| 3 | Sodium converted to hydrogen. | Not published, but according to the manufacturer this resin reacts as a "conventional gel porosity" resin. |
| 4 | do | Not published, but according to the manufacturer this resin reacts as a "large porosity" less resin. |

| Number | Apparent pK value in one molar potassium chloride solution | Exchange capacity (meq./gm.) of oven dried resin |
|---|---|---|
| 1 | About 6.0 | 10.3 |
| 2 | do | 10.3 |
| 3 | About 1.3 | 5.2 |
| 4 | Not published | 6.6 |

| Number | Particle size ($\mu$) | Percent external water |
|---|---|---|
| 1 | 150-40 | Maximum 5.0. |
| 2 | 95% <40 | Do. |
| 3 | 95% <40 | Maximum 10.0. |
| 4 | 150-75 | Maximum 4.0. |

The amount of nicotine, water-soluble physiologically-acceptable nicotine salts, or mixtures thereof bound to an ion exchanger, may be varied depending on the conditions employed and the type of ion exchanger used.

Thus it has been found that nicotine-ion exchange complexes in which the content of nicotine amounts to about 2 to 60 weight percent, and preferably about 5 to 35 percent of the nicotine to the ion exchange complex, are especially suitable for incorporation into compositions of the invention. For carboxylic acid group containing ion exchangers, the preferred range is about 5 to 35 percent, whereas for phosphonic acid group containing ion exchangers the preferred range is about 5 to 30 percent, and the preferred range for sulphonic acid group containing ion exchangers is about 5 to 25 percent.

Part of the nicotine may occur bound to the ion exchanger through surface adsorption as opposed to real ion exchange reaction.

Suitable and preferred amounts of nicotine for the formation of the ion exchange resin complexes for use in the invention are set out below.

| Nicotine-ion exchange complex | Percent nicotine by weight in complex |
|---|---|
| Amberlite IRP 64M nicotine complex | 2-60, preferably 5-35. |
| Amberlite IR 118 nicotine complex | 2-35, preferably 5-20. |
| BIO-REX 63 nicotine complex | 2-40, preferably 5-30. |
| Amberlite IRP 69M nicotine complex | 2-35, preferably 5-25. |
| Amberlite IRP 64 nicotine complex | 2-60, preferably 5-35. |
| Amberlite IRC 50 nicotine complex | 2-60, preferably 5-35. |
| Amberlite IRP 69 nicotine complex | 2-35, preferably 5-25. |
| BIO-REX 40 nicotine complex | 2-25, preferably 5-15. |
| BIO-REX 70 nicotine complex | 2-60, preferably 5-35. |
| Duolite ES-62 nicotine complex | 2-35, preferably 5-25. |
| Duolite ES-65 nicotine complex | 2-25, preferably 5-15. |
| Chelex 100 nicotine complex | 2-25, preferably 5-15. |
| CM Sephadex C-25 nicotine complex | 2-30, preferably 5-20. |
| SE Sephadex C-25 nicotine complex | 2-15, preferably 5-10. |

The chewing gum component of the compositions of the invention may be of any convenient nature and preferably is of a generally available commercial type. For example it can comprise a gum base of natural or synthetic origin. Natural gum bases include, e.g., Chicle-, Jelutong-, Lechi di Caspi-, Soh-, Siak-, Katiau, Sorwa-, Balata-, Pendare, Perillo-, Malaya- and Percha gums, natural caoutchouc such as Crepe, Latex and Sheets, and natural resins such as Dammar and Mastix. Synthetic gum bases are polyvinylacetate ("Vinnapas"), "Dreyco" commercial gum base, polyvinyl esters, polyisobutylene and non-toxic butadienestyrene lattices among others. Softeners (plasticizers) are, as is conventional in the art, incorporated into the commercially available chewing gum base to help reduce the viscosity of the rubber blend to a desirable consistency and to improve the texture. Some of the common softeners or plasticizers are: lecithin, lanolin, hydrogenated coconut oil, hydrogenated cotton seed oil, mineral oil, olive oil, Vaseline, Carnauba wax, Candelilla wax, paraffin, beeswax, stearic acid, glyceryl monostearate, glycerine, honey, propylene glycol, hexylene glycol and sorbitol. These softeners also act as moisture-retaining agents at the same time. Miscellaneous other optional additives in a chewing gum composition are: cerelose, mannitol, diastatic malt, starch, calcium carbonate, talcum, defatted cocoa, flavors and food colors. Sugar in the form of sucrose and commercial glucose (corn syrup) comprises the bulk of a chewing gum formula, but completely sugar- and/or glucose-free chewing gum compositions work equivalently in the present invention.

For the purposes of the present invention, the chewing gum component can be formulated with the following constituents which are present in varying amounts. The gum base can be of natural or synthetic origin, preferably the latter, and can be present in the chewing gum formulation in an amount in the range from about 15 to about 80 weight percent, preferably from about 50 to about 80 weight percent and most preferably from about 60 to about 75 weight percent. If nicotine is incorporated in the free base form or in the form of a salt, the chewing gum composition should have a relatively high gum base concentration of at least about 40 percent by weight.

Powdered sugar, preferably powdered sorbitol, can be present in an amount in the range from about 15 to about 80 weight percent, preferably from about 16 to about 40 weight percent, and most preferably from about 20 to about 32 weight percent.

Corn syrup, usually of about 41° to 46° Baumé, preferably an amount about 70 percent aqueous solution of sorbitol, can be present in an amount in the range from about 4 to about 30 weight percent, preferably from about 4 to about 10 weight percent, and most preferably from about 5 to about 8 weight percent.

Special formulas for chewing gums exist, such as sugar-free compositions with a concentration of as much as 80 percent chewing gum base, preferably of synthetic origin.

Variations of the consistency, on the one hand the preliminary consistency at the very beginning of the chewing, and on the other hand the secondary consistency after some chewing, is achieved simply by varying amounts and proportions of the above formula. The consistency and the stickiness of the chewing gum can be influenced by the addition of various substances, as previously mentioned.

Compositions according to the invention can be formed simply by mixing the chewing gum mass with either the nicotine-ion exchanger complex, the nicotine-regenerative adsorbent complex, or the nicotine as base, or as salt. Before adding any solid component, except for the gum base, it is desirable to grind and size the solid component first, to ensure a good distribution. The mixing is preferably conducted at a suitable elevated temperature depending upon the viscosity of chewing gum mass employed, since the increased temperature decreases the viscosity of the gum and thereby enables the active ingredients to be evenly and intimately distributed into the chewing gum. The complex particle size in the gum should be small enough not to cause damage to teeth during chewing, however.

Conveniently, compositions of the present invention are made simultaneously with the incorporation of any additives such as corn syrup, sugar, sorbitol, and flavors into the chewing gum base. Thus, for example, the composition can be made in a suitable kettle, for example, a steam jacketed mixer, which is warmed and the gum base added and mixed until sufficiently free from lumps. Next, sorbitol or corn syrup and sugar are incorporated into the base.

Depending on the physical properties of the physiologically-acceptable buffering substances that may be incorporated as additional ingredients according to this invention, it will be convenient to add these either with the liquid part or with the solid part of the composition. In the case of buffering substances available as fine powders, it will be most convenient to add these powders with the solid, powdered part of sorbitol or sugar, etc. Finally, flavors, softeners, and other additives are poured in and well distributed. The mass is cooled, rolled, scored, and hardened sufficiently, then coated if desired, before final wrapping and analyzing. Controlled humidity rooms assure consistent moisture content and prevent "sweating" of the gum. It is preferred to use just enough heat to soften the gum base sufficiently for mixing. The addition of sugar and syrup tends to lower the temperature, and the various nicotine containing active ingredients according to this invention together with flavor, if desired, are added only when the mixture has cooled sufficiently. This minimizes uncontrollable losses of nicotine and/or flavor content to a marked degree.

The percent by weight of the various nicotine containing active ingredients according to this invention, either each or mixtures thereof, to the total weight of the gum, is not critical so long as the desired amount of nicotine is present but varies between an upper and a lower most suitable range, specific to the formula used. Thus it has been found that compositions wherein the percent by weight of the nicotine or nicotine-containing active ingredients to the total weight of the gum is about 0.1 to 10 percent, preferably about 0.2 to 5 percent, and most preferably about 0.5 to 2 percent, are suitable.

Representative combinations of suitable buffering agents in the nicotine-gum compositions of the invention are as follows:

0.5 to 5 percent by weight, preferably one to three percent by weight of total ingredients of:
  (a) anhydrous sodium carbonate;
  (b) anhydrous potassium carbonate;
  (c) mixtures of (a) and (b);
  (d) (a), (b), or (c) plus potassium bicarbonate;
  (e) (a), (b), (c), or (d) plus sodium bicarbonate (bicarbonates result in a smaller rise in pH when included, but retaining good buffer capacity—very good where too high a pH might annoy a sensitive user); particularly (f) 1.5 percent anhydrous sodium carbonate, 1.5 percent anhydrous potassium carbonate, one percent anhydrous sodium bicarbonate;

(g) 2–5 percent trisodium phosphate plus 1–2 percent disodium phosphate or sodium bicarbonate;

(h) calcium hydroxide 0.5–3 percent, preferably about two percent;

(i) (h) together with sodium or potassium bicarbonate;

(j) one percent sodium carbonate, one percent potassium carbonate, and one percent sodium or potassium bicarbonate;

(k) 0.5 percent each of sodium and potassium carbonate;

(l) 2 percent calcium hydroxide and 1 percent sodium bicarbonate;

(m) 0.5 percent each of sodium carbonate, potassium carbonate, and sodium bicarbonate.

Still others will be apparent from the following.

DESCRIPTION OF THE PREFERRED EMBODIMENTS

Some Preparations and Examples are now given, which are illustrative only of the present invention and are not to be construed as limiting.

Preparation 1.—A nicotine-ion exchange complex containing 200 mg. of nicotine in 800 mg. of the ion exchanger Amberlite IRP 64M in the dry state, i.e., a 20 percent compound (complex). The moisture content of the ion exchanger is determined by drying in an oven at 105° C. to a constant weight.

100.0 grams of the ion exchanger, calculated as dry are added to a beaker containing 25.0 grams nicotine, calculated as 100 percent, diluted to a total volume of 500 ml. by addition of distilled water. The mixture is stirred for at least one hour with a magnetic stirrer, or the like. The loaded ion exchanger is then separated by filtration or centrifugation. The filtercake is then broken into pieces and dried at about 20° C. in a drying cabinet provided with a fan. The nicotine ion exchange complex thus obtained is then analyzed with reference to the nicotine content after careful blending and sieving through a 300 mesh sieve.

Preparation of the other various nicotine-ion exchange complexes mentioned below is in accord with the foregoing example, or with only minor variations as are well known to one skilled in the art of handling ion exchangers. All percentages indicated are by weight.

Preparation 2

| | Percent |
|---|---|
| Granulated sugar | 14.5 |
| Condensed sweetened milk (low in fat content) | 4.5 |
| Powdered glucose | 30.0 |
| Chicle gum | 20.0 |
| Powdered sugar | 30.0 |
| Tolu-balsam | 1.0 |

Preparation 3

| | Percent |
|---|---|
| Dreyco Commercial Gum Base (synthetic) | 16.9 |
| Powdered glucose | 22.5 |
| Powdered sugar | 60.0 |
| Water | 0.3 |
| Glycerine | 0.3 |

Preparation 4

| | Percent |
|---|---|
| Natural gum base | 22.0 |
| Powdered sugar | 64.0 |
| Corn syrup 45° Baumé | 14.0 |

Preparation 5

| | Percent |
|---|---|
| Natural gum base | 22.0 |
| Diastatic malt | 1.0 |
| Corn syrup 44° Baumé | 15.0 |
| Powdered sugar | 60.0 |
| Calcium carbonate | 2.0 |

Preparation 6

| | Percent |
|---|---|
| Natural gum base | 22.0 |
| Diastatic malt | 2.0 |
| Invert sugar | 5.0 |
| Corn syrup 44° Baumé | 13.0 |
| Powdered sugar | 51.0 |
| Cerelose | 7.0 |

Preparation 7

Summer formula:

| | Percent |
|---|---|
| Natural gum base | 22.0 |
| Powdered sugar | 50.0 |
| Corn syrup 45° Baumé | 24.0 |
| Calcium carbonate | 2.0 |
| Powdered starch | 2.0 |

Preparation 8

Winter formula:

| | Percent |
|---|---|
| Natural gum base | 22.0 |
| Powdered sugar | 53.0 |
| Corn syrup 44° Baumé | 21.0 |
| Calcium carbonate | 2.0 |
| Powdered starch | 2.0 |

Preparation 9

Stick gum formula:

| | Percent |
|---|---|
| Stick gum base | 19.9 |
| Powdered sugar | 54.5 |
| Powdered glucose | 9.9 |
| Corn syrup 45° Baumé | 14.9 |
| Glycerine | 0.2–0.5 |
| Flavoring oil | 0.6 |

Preparation 10

Bubble gum formula:

| | Percent |
|---|---|
| Bubble gum base | 18.0 |
| Powdered sugar | 55.9 |
| Powdered glucose | 9.0 |
| Corn syrup 45° Baumé | 16.2 |
| Glycerine | 0.2–0.7 |
| Flavoring oil | 0.6 |

Preparation 11

Sugar coated gum formula:

| | Percent |
|---|---|
| Sugar coated gum base | 22.0 |
| Powdered sugar | 55.1 |
| Powdered glucose | 5.5 |
| Corn syrup 45° Baumé | 16.5 |
| Flavoring oil | 0.7 |
| Glycerine | 0.2–0.5 |

The gums are coated with white or colored sugar in rotating-pans in the usual manner for the coating of drageés.

Preparation 12

Sugar- and glucose-free formula:

| | Percent |
|---|---|
| Natural gum base | 29.2 |
| Powdered sorbitol | 45.8 |
| Calcium carbonate | 8.5 |
| Sorbitol, 70% H$_2$O solution | 16.5 |

Preparation 13

Formula with high chewing gum base concentration, sugar- and glucose-free:

| | Percent |
|---|---|
| Synthetic gum base | 73.7 |
| Powdered sorbitol | 19.8 |
| Sorbitol, 70% H$_2$O solution | 3.8 |
| Glycerine | 0.7 |
| Flavoring oil | 2.0 |

Preparation 14

| | Percent |
|---|---|
| Synthetic gum base | 55.0 |
| Powdered sorbitol | 34.0 |
| Sorbitol, 70% $H_2O$ solution | 8.9 |
| Glycerine | 0.6 |
| Flavoring oil | 1.5 |

Preparation 15

| | Percent |
|---|---|
| Natural gum base | 40.0 |
| Powdered sugar | 46.7 |
| Corn syrup 45° Baumé | 11.7 |
| Glycerine | 0.5 |
| Flavoring oil | 1.1 |

The following Examples demonstrate the compositions and methods according to the invention. Each of these is made by warming the gum base in a kettle and then adding the various additives, in the general method described above.

EXAMPLE 1

1000 pieces of chewing gum each containing 3 mg. of nicotine bound to Amberlite IRP 64M as a 10 percent complex, and 0.5 percent each of sodium carbonate ($Na_2CO_3$), potassium carbonate ($K_2CO_3$), and sodium bicarbonate ($NaHCO_3$).

| | Grams |
|---|---|
| Chewing gum mass according to Preparation 3 | 1940 |
| Amberlite IRP 64M 10 percent nicotine complex | 30.0 |
| Sodium carbonate | 10.0 |
| Potassium carbonate | 10.0 |
| Sodium bicarbonate | 10.0 |

EXAMPLE 2

1000 pieces of chewing gum each containing 2.5 mg. of nicotine bound to Amberlite IRP 64M as a ten percent complex, and likewise 2.5 mg. of nicotine bound to Amberlite IRP 64M as a 20 percent complex, and 0.5 percent each of sodium carbonate and potassium carbonate.

| | Grams |
|---|---|
| Chewing gum mass according to Preparation 4 | 1942.5 |
| Amberlite IRP 64M 10 percent nicotine complex | 25.0 |
| Amberlite IRP 64M 20 percent nicotine complex | 12.5 |
| Sodium carbonate | 10.0 |
| Potassium carbonate | 10.0 |

EXAMPLE 3

1000 pieces of chewing gum each containing 1 mg. of nicotine bound to Amberlite IRP 64M as a 30 percent complex, 3 percent of sodium carbonate, and 1 percent of sodium bicarbonate.

| | Grams |
|---|---|
| Chewing gum mass according to Preparation 6 | 2876.67 |
| Amberlite IRP 64M 30 percent nicotine complex | 3.33 |
| Sodium carbonate | 90.0 |
| Sodium bicarbonate | 30.0 |

EXAMPLE 4

1000 pieces of chewing gum each containing 3 mg. of nicotine bound to Amberlite IRP 69M as a 20 percent nicotine complex, and 1 percent each of sodium carbonate, potassium carbonate, and sodium bicarbonate.

| | Grams |
|---|---|
| Chewing gum mass according to Preparation 3 | 1440 |
| Amberlite IRP 69M 20 percent nicotine complex | 15.0 |
| Sodium carbonate | 15.0 |
| Potassium carbonate | 15.0 |
| Sodium bicarbonate | 15.0 |

EXAMPLE 5

1000 pieces of chewing gum each containing 4 mg. of nicotine bound to BIO-REX 63, converted to the hydrogen ionic form, as a 15 percent complex, 2 percent calcium hydroxide ($Ca(OH)_2$), and 1 percent sodium bicarbonate.

| | Grams |
|---|---|
| Chewing gum mass according to Preparation 13 | 1913.3 |
| BIO-REX 63 15 percent nicotine complex | 26.7 |
| Calcium hydroxide | 40.0 |
| Sodium bicarbonate | 20.0 |

EXAMPLE 6

1000 pieces of chewing gum each containing 2 mg. of nicotine bound to Amberlite IRP 69M as a 15 percent complex, 1.5 percent of trisodium phosphate $$(Na_3PO_4 \cdot 12H_2O)$$

and 1 percent of sodium bicarbonate.

| | Grams |
|---|---|
| Chewing gum mass according to Preparation 15 | 961.67 |
| Amberlite IRP 69M 15 percent nicotine complex | 13.33 |
| Sodium triphosphate | 15.0 |
| Sodium bicarbonate | 10.0 |

EXAMPLE 7

1000 pieces of chewing gum each containing 2 mg. of nicotine as acid nicotine d-tartrate $$(C_{10}H_{14}N_2 \cdot 2C_4H_6O_6 \cdot 2H_2O),$$

3 percent of sodium carbonate, and 1 percent of sodium bicarbonate.

| | Grams |
|---|---|
| Chewing gum mass according to Preparation 14 | 1913.84 |
| Acid nicotine d-Tartrate | 6.16 |
| Sodium carbonate | 60.0 |
| Sodium bicarbonate | 20.0 |

EXAMPLE 8

1000 pieces of chewing gum each containing 4 mg. of nicotine as nicotine dihydrochloride ($C_{10}H_{14}N_2 \cdot 2HCl$), 3 percent of potassium carbonate, and 1 percent of sodium bicarbonate.

| | Grams |
|---|---|
| Chewing gum mass according to Preparation 13 | 951.27 |
| Nicotine, 100% ($C_{10}H_{14}N_2$) | 4.0 |
| Hydrochloric acid, 38% | 4.73 |
| Potassium carbonate | 30.0 |
| Sodium bicarbonate | 10.0 |

EXAMPLE 9

1000 pieces of chewing gum each containing 4 mg. of nicotine as neutral nicotine sulphate $$[(C_{10}H_{14}N_2)_2 \cdot H_2SO_4],$$

and 1 percent each of sodium carbonate, potassium carbonate, and sodium bicarbonate.

| | Grams |
|---|---|
| Chewing gum mass according to Preparation 15 | 964.72 |
| Nicotine, 100% | 4.0 |
| Sulphuric acid, 95% | 1.28 |
| Sodium carbonate | 10.0 |
| Potassium carbonate | 10.0 |
| Sodium bicarbonate | 10.0 |

EXAMPLE 10

1000 pieces of chewing gum each containing 2 mg. of nicotine as base, and 0.5 percent each of sodium carbonate, potassium carbonate, and sodium bicarbonate.

|  | Grams |
|---|---|
| Chewing gum mass according to Preparation 13 | 983 |
| Nicotine, 100% | 2.0 |
| Sodium carbonate | 5.0 |
| Potassium carbonate | 5.0 |
| Sodium bicarbonate | 5.0 |

EXAMPLE 11

1000 pieces of chewing gum each containing 3 mg. of nicotine bound to silicic acid as a ten percent complex, 3 percent of sodium carbonate, and 1 percent of sodium bicarbonate.

|  | Grams |
|---|---|
| Chewing gum mass according to Preparation 14 | 930 |
| Silicic acid—10% nicotine complex | 30.0 |
| Sodium carbonate | 30.0 |
| Sodium bicarbonate | 10.0 |

EXAMPLE 12

100 pieces of chewing gum each containing 2.5 mg. of nicotine bound to silicic acid as a 10 percent complex, and likewise 2.5 mg. of nicotine bound to silicic acid as a 20 percent complex, and 1 percent each of sodium carbonate, potassium carbonate, and sodium bicarbonate.

|  | Grams |
|---|---|
| Chewing gum mass according to Preparation 13 | 1417.5 |
| Silicic acid—10% nicotine complex | 25.0 |
| Silicic acid—20% nicotine complex | 12.5 |
| Sodium carbonate | 15.0 |
| Potassium carbonate | 15.0 |
| Sodium bicarbonate | 15.0 |

EXAMPLE 13

1000 pieces of chewing gum each containing 1 mg. of nicotine bound to silicic acid as a 30 percent complex, and 0.5 percent each of sodium carbonate and potassium carbonate.

|  | Grams |
|---|---|
| Chewing gum mass according to Preparation 15 | 739.17 |
| Silicic acid—30% nicotine complex | 3.33 |
| Sodium carbonate | 3.75 |
| Potassium carbonate | 3.75 |

Preparation of chewing gums containing other nicotine salts or other various nicotine-ion exchange complexes or other nicotine-regenerative adsorbent complexes mentioned in the present application, either separately or mixtures thereof, is carried out in the manner of the foregoing Examples, with only such minor variations as are well known to every person skilled in the art of manufacturing chewing gums.

EXAMPLE 14

A nicotine ion exchange complex with Amberlite IRP 64M is prepared by the method described in Preparation 1, the resultant complex containing 10% nicotine.

434 grams natural gum base is put into a hot jacketed mixer fitted with stirrers. The mixer is heated by steam at about 15 lbs. per square inch. The stirrers are run at intervals to turn the base over. A low steam pressure is selected to prevent overheating of the base. After the base is completely melted, the steam is turned off in the mixer and cold water is run through the jacket to reduce the temperature of the contents to about 85° C. 840 grams of powdered sugar (300 mesh sieve) and 276 grams corn syrup 45° Baumé are then added to the melted base in the mixer and the mass is mixed for about fifteen minutes. The mixture will now have a temperature of between 60 and 75° C.

A further 380 grams of powdered sugar, 30 grams of the nicotine ion exchange complex, 20 grams of sodium carbonate and 20 grams of potassium carbonate, all 300 mesh sieve, are mixed together and are then added as a powder mixture to the molten mixture in the kettle. The melt is mixed for a further five minutes, so that the total mixing time is about twenty minutes. The nicotine complex and buffer are dispersed or distributed uniformly throughout the composition.

The temperature in the kettle will at the end of this time have dropped to between 40 and 60° C. It s desirable that the mix should be as cool as possible before mixing stops, but viscosity increases as the temperature drops and mixing must stop before the mixture becomes too stiff for the mixing machine. In practice the operator judges when to stop mixing not so much by the actual thermometer reading as by the consistency of the mix.

After mixing, the batch of gum is cut into pieces of a size suitable for feeding to whatever type of extruder is available. The extruder jacket is usually heated by means of warm water at 45 to 50° C. This gives a more even extrusion than when the extruder is heated by steam and it permits better temperature control. The extruded stick of gum should be well dusted with starch or a mixture of icing sugar and starch to prevent it from sticking to sizing rollers and cutters. The rollers serve to roll it down to the desired size. The cutters are preferably maintained at about 25° C.

The precise manner of shaping the gum in the extruder and afterward is, however, fairly conventional and will be selected according to the desired shape and size of the resultant pieces. Each piece generally weighs between 1 and 3 grams. In this Example, 1000 pieces, each weighing two grams and containing 3 mg. of nicotine and 1 percent each of sodium carbonate and potassium carbonate, were provided by the conventional extruding and cutting procedure. Likewise, the pieces are packed and stored under fairly conventional conditions. For example, the wrapping room is preferably maintained at 20° C. and a relative humidity of 45 to 50% and the pieces are preferably stored at a temperature of 18 to 20° C. and a relative humidity of 45 to 50%.

It will be appreciated that combinations of one or more of nicotine, nicotine salts, nicotine regenerative adsorbents, and nicotine ion-exchange complexes with gums other than those illustrated by the foregoing Examples can be used, and that innumerable combinations with other flavoring agents, sweetening agents, binders and similar additives can also be employed.

The nicotine-gum products of each of the foregoing Examples upon chewing raised the pH of the buccal cavity above the normal physiological pH, usually to about 8–10, and maintained such level for at least 5–10 minutes of chewing, frequently as long as 15 minutes of chewing. No substantial throat or mucous membrane irritation was reported. The nicotine was released slowly and uniformly over the period of chewing, and all compositions employed were reported to provide a sense of smoking satisfaction to the chewer.

The foregoing discussion and Examples are intended as illustrative only and are not to be construed as limiting. Still other variations with the spirit and scope of the present invention will readily present themselves to one skilled in the art.

We claim:

1. In a chewable smoking substitute composition for providing a sense of smoking satisfaction without smoking, comprising a gum base, present in an amount of about 15 to about 80 percent by weight of the composition, and nicotine, the improvement which comprises the presence of a solid physiologically-acceptable water-soluble buffering agent dispersed in said chewable smoking substitute composition in an amount sufficient upon chewing of said composition to raise the pH of the saliva of the chewer above the normal physiological pH of said amount of buffering agent being about one-half to five percent by weight of the total composition.

2. A composition of Claim 1 wherein the buffering agent is present in an amount sufficient to raise the pH of the saliva above about 7.5.

3. A composition of Claim 1 wherein the buffering agent is present in an amount sufficient to maintain the pH of the saliva at about 8–10.

4. A composition of Claim 1 wherein the buffering agent is present in an amount sufficient to maintain the pH of the saliva at about 8–10 for at least 5–10 minutes of chewing.

5. A composition of Claim 1 wherein the amount of nicotine present is one to ten milligrams per chewing gum unit.

6. A composition of Claim 1 wherein the amount of nicotine present is about one to five milligrams per chewing gum unit.

7. A composition of Claim 1 wherein the amount of buffering agent is about one to three percent by weight of the total composition.

8. A composition of Claim 1 wherein the buffering agent comprises an alkali metal carbonate or phosphate.

9. A composition of Claim 1 wherein the buffering agent comprises an alkali metal carbonate selected from the group consisting of potassium carbonate and sodium carbonate.

10. A composition of Claim 1 wherein the buffering agent comprises an alkali metal carbonate or phosphate in combination with an alkali metal bicarbonate.

11. A composition of Claim 1 wherein the buffering carbonate together with an alkali metal bicarbonate selected from the group consisting of sodium bicarbonate and potassium bicarbonate.

12. A composition of Claim 1 wherein the nicotine is present in a form selected from the group consisting of nicotine free base, a water-soluble physiologically-acceptable salt thereof, nicotine sorbed on a physiologically-acceptable adsorbent, and nicotine in the form of a complex with an insoluble cation-exchanger, wherein the buffering agent is capable of maintaining the pH of the saliva at about 8–10 for at least 5–10 minutes of chewing and constitutes 0.5 to 5 percent by weight of the total composition, and wherein the amount of nicotine present calculated as the free base is one to ten milligrams per chewing gum unit.

13. A composition of Claim 12, wherein the amount of nicotine present calculated as the free base is about one to five milligrams per chewing gum unit, and wherein the buffering agent is present in amount of about one to three percent by weight of the total composition and comprises an alkali metal carbonate or phosphate.

14. A composition of Claim 13 wherein the buffering agent also comprises an alkali metal bicarbonate.

15. A composition of Claim 1 wherein the nicotine is present in a form selected from the group consisting of nicotine free base, a water-soluble physiologically-acceptable salt thereof, nicotine sorbed on a physiologically-acceptable adsorbent, and nicotine in the form of a complex with an insoluble cation-exchanger.

16. A composition of Claim 15 wherein the buffering agent comprises an alkali metal carbonate or phosphate in combination with an alkali metal bicarbonate.

17. A composition of Claim 15 wherein the buffering agent comprises an alkali metal carbonate or phosphate.

References Cited

UNITED STATES PATENTS

| | | | |
|---|---|---|---|
| 904,521 | 11/1908 | Ellis | 426—3 |
| 3,590,120 | 6/1971 | Muhler | 424—48 |
| 2,218,172 | 10/1940 | Kokatnur | 424—48 |
| 2,554,465 | 5/1951 | Kraus | 424—48 |

OTHER REFERENCES

Larson et al., Tobacco—Experimental and Clinical Studies (Comp. Accnt), Williams & Wilkins Co., 1961, pp. 540–517.

A. LOUIS MONACELL, Primary Examiner

J. M. HUNTER, Assistant Examiner

UNITED STATES PATENT OFFICE
CERTIFICATE OF CORRECTION

Patent No. 3,845,217     Dated October 29, 1974

Inventor(s) Ove Birger Fernö et al.

It is certified that error appears in the above-identified patent and that said Letters Patent are hereby corrected as shown below:

| | |
|---|---|
| Col. 1, lines 40-41 | "940,521" -- 904,521 -- |
| Col. 4, line 70 | "discolsed" -- disclosed -- |
| Col 5, line 68 | "(R.COO$_3^-$H$^+$)" -- (R.COO$^-$H$^+$) -- |
| Col. 13, line 24 | "100 pieces" -- 1000 pieces -- |
| Claim 1<br>Col. 14, lines 72-73 | "of said amount" -- saliva, said amount -- |
| Claim 11<br>Col. 15, line 30 | after line 1 of Claim 11, the following was omitted:<br>-- agent comprises an alkali metal carbonate selected from the group consisting of sodium carbonate and potassium -- |

Signed and sealed this 7th day of January 1975.

(SEAL)
Attest:

McCOY M. GIBSON JR.
Attesting Officer

C. MARSHALL DANN
Commissioner of Patents